Jan. 23, 1940.  C. J. THOMPSON  2,188,097

CALIBRATOR FOR THE COMPENSATING WEDGE OF PHOTOMETERS

Filed July 23, 1938

Inventor
C. J. THOMPSON

By
Attorneys

Patented Jan. 23, 1940

2,188,097

UNITED STATES PATENT OFFICE 2,188,097

CALIBRATOR FOR THE COMPENSATING WEDGE OF PHOTOMETERS

Clifford J. Thompson, Washington, D. C.; dedicated to the free use of the People of the United States of America Application July 23, 1938, Serial No. 220,944

2 Claims. (Cl. 88—23)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Goverment of the United States of America for governmental purposes without the payment to me of any royalty thereon.

I hereby dedicate the invention herein described to the free use of the people of the United States of America to take effect on the granting of a patent to me.

This invention relates to photometers and it is more particularly concerned with a device for calibrating positions of the compensating wedge employed by many types of absorption photometers.

Figure 1:
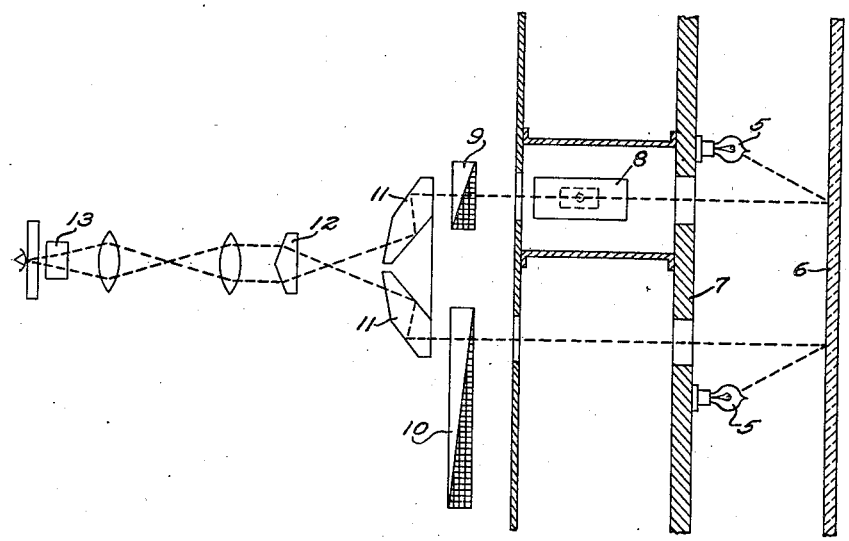

In order to fully describe this invention and its objects and advantages, the accompanying drawing in Figure 1 illustrates a schematic diagram showing a plan view of one of the many types of photometers to which this invention is applicable. Referring to this Figure 1, light from the lamps 5, 5 after reflection from the reflecting surface 6 is divided into two beams by means of the aperture plate 7. One of these two beams passes through the solution in the absorption cell 8. The beam then continues through a small compensating wedge 9 of neutral glass and thus into one of the totally reflecting prisms 11, 11 which causes the beam to pass through the biprism 12 and the magnifying eye piece to appear to the observer as one half of the field of view. The other beam passes through the measuring wedge 10, through the other totally reflecting prism and thence through the biprism 12 to the magnifying eye piece to appear to the observer as the second half of the field of view. A color filter 13 is disposed within the eye piece, or at any other suitable place. The two halves of the field of view can be matched to equal brilliance by moving either the compensating wedge 9 or the measuring wedge 10 at right angles to the light beams. If these two halves of the field of view are matched, first with a known solution of a particular chemical by means of the compensating wedge 9, while the measuring wedge 10 is set at zero, and then with an unknown solution of the same chemical substituted for the known solution, the distance traversed by the measuring wedge 10 to return the two halves of the field of view into matched relation is a function of the chemical difference between the known and unknown solutions. From the above it will be understood that for each determination a known solution is placed in the absorption cell and the compensating wedge adjusted to bring the two halves of the field of view into matched relation. The object of this invention is to eliminate this step by providing a device which will permit the making of standardizations with the result that once the instrument is standardized, the compensating wedge is simply moved to a predetermined position for the solution of the chemical to be tested, obviating the necessity of matching the two halves of the field of view with a known solution of that same chemical to be tested.

Figure 3:
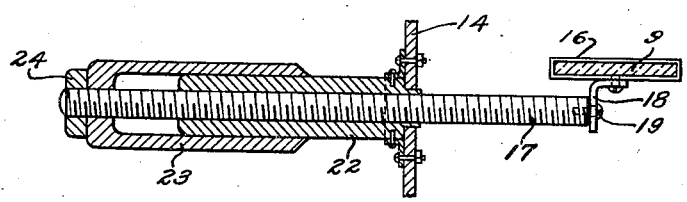
Figure 2:
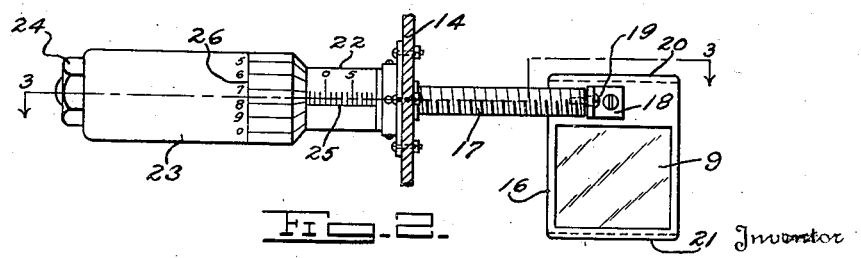

To illustrate this device, Figure 2 shows a fragment of the compensating wedge housing 14 with the compensating wedge 9 and its frame 16 disposed therein, and Figure 3 is a sectional view along the line 3—3 of Figure 2.

Referring with more particularity to Figures 2 and 3 in which like numerals designate like parts, this device consists of a threaded shaft 17 disposed through the housing 14. One end of the shaft 17 is attached to the frame 16 of the compensating wedge 9 by means of an angle 18 secured to said frame 16 and a stepped screw 19. This connection is so made that the shaft 17 is free to rotate with respect to angle 18 and at the same time there is no play axially of the angle 18 between the stepped screw 19 and the end of the shaft 17. The frame 16 of the compensating wedge is provided with an upper flange 20 and a lower flange 21 both of which ride in grooved tracks. This, however, is no part of the present invention but is merely mentioned for the purpose of showing how the compensating wedge is normally held in a substantially vertical position unaffected by slight friction in the connection between angle 18 and the end of the shaft 17. The remaining parts of this device are disposed on the outside of the compensating wedge housing 14, having a body portion 22 mounted on and engaged with the threads of the shaft 17. This body member 22 abuts the housing 14, is rigidly secured thereto, and carries the barrel member 23 rotatably mounted thereon. The said barrel member 23 is secured to the end of the shaft 17 by means of a lock nut 24. A rotation of the barrel 23 has the effect of rotating the shaft 17 and translating it together with the compensating wedge either to the right or to the left depending upon the direction of the rotation of the barrel 23. Since the barrel 23 is fixed to the shaft 17, it also is translated over the body member 22 a distance equal to that translated by the compensating wedge. The body member 22 is provided with a scale 25 longitudinally and the barrel member is provided with a scale 26 circumferentially by means of which relative positions of the compensating wedge may be determined.

In using this invention known solutions of chemicals are placed in the absorption cell of the photometer and using optimum color filters, the two halves of the field of view are matched by translating the compensating wedge. The position of the compensating wedge is recorded as a reading of the two scales 25 and 26. Consequently, for all subsequent determinations of unknown solutions of the same chemical, it is not necessary to again match the two halves of the field of view with a known solution. The compensating wedge is simply moved to the predetermined position as previously calibrated with that chemical.

Having thus described my invention, I claim:

1. In combination with a photometer having a compensating wedge and a housing thereof, means for calibrating relative positions of said wedge, said means comprising a shaft rotatably mounted through the housing of said wedge, a frame for said wedge, said shaft being pivotally attached to said housing, said shaft being in threaded engagement with a body member fixed to said wedge housing; a cylindrical barrel rotatably and translatively mounted on a portion of said body member the outer end of which barrel member is fixed to the outer end of said shaft; and graduated scales for indicating the relative positions of said barrel member with respect to said body member.

2. In combination with a photometer having a compensating wedge and a housing therefor, a shaft rotatably mounted through said housing, a frame supporting said wedge, a bracket secured to said frame and pivotally connected to the end of said shaft projecting within said housing, a body member fixed to the outside of said housing, said body member being in threaded engagement on said shaft, and a cylindrical barrel on said body member, the outer end of said barrel member being fixed to the outer end of said shaft.

CLIFFORD J. THOMPSON.